Dec. 16, 1952     I. M. LADDON ET AL     2,621,565
BOMB HANDLING MEANS
Filed Dec. 14, 1939     5 Sheets-Sheet 1
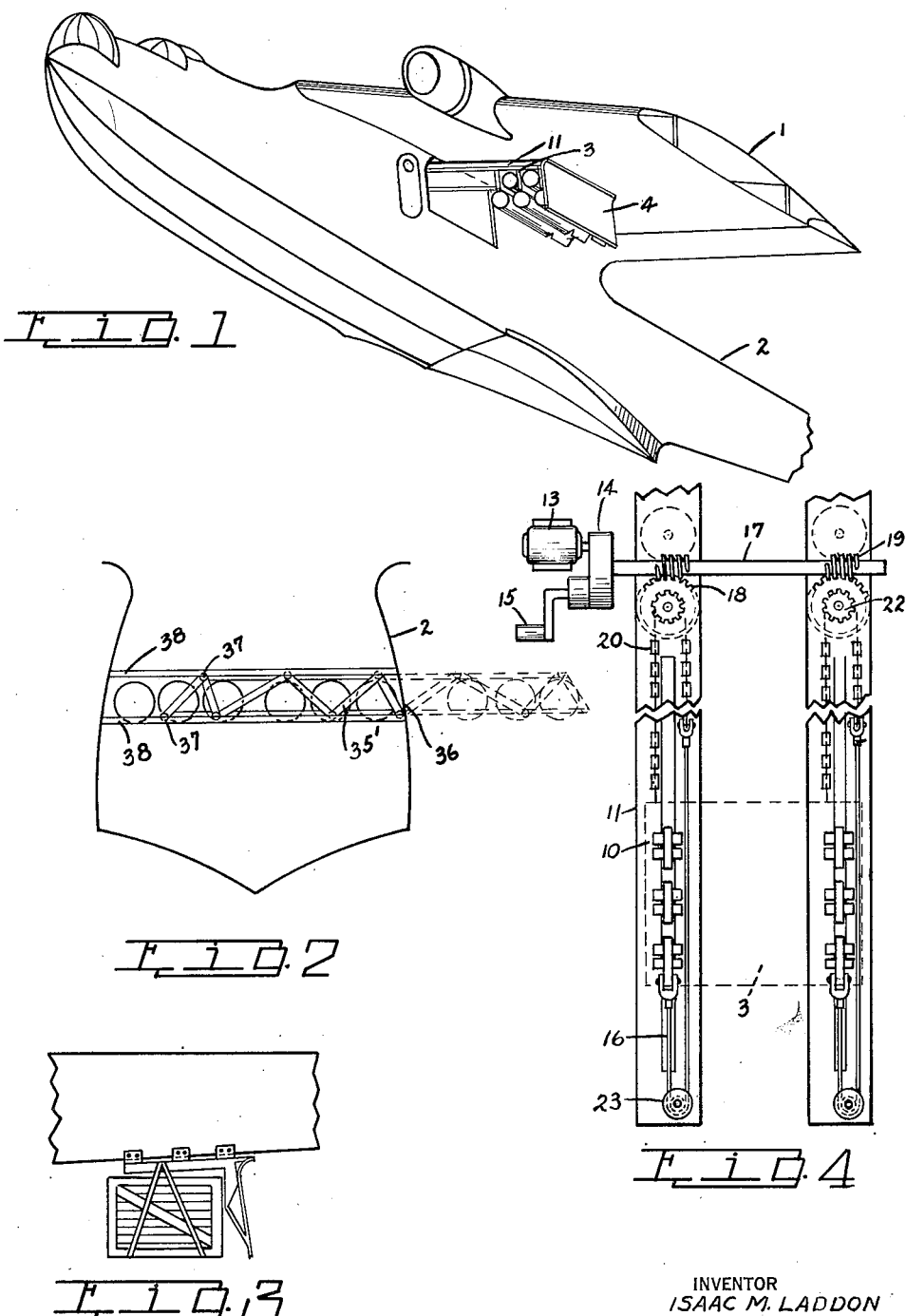
INVENTOR
ISAAC M. LADDON
THEODORE P. HALL
BY
ATTORNEY

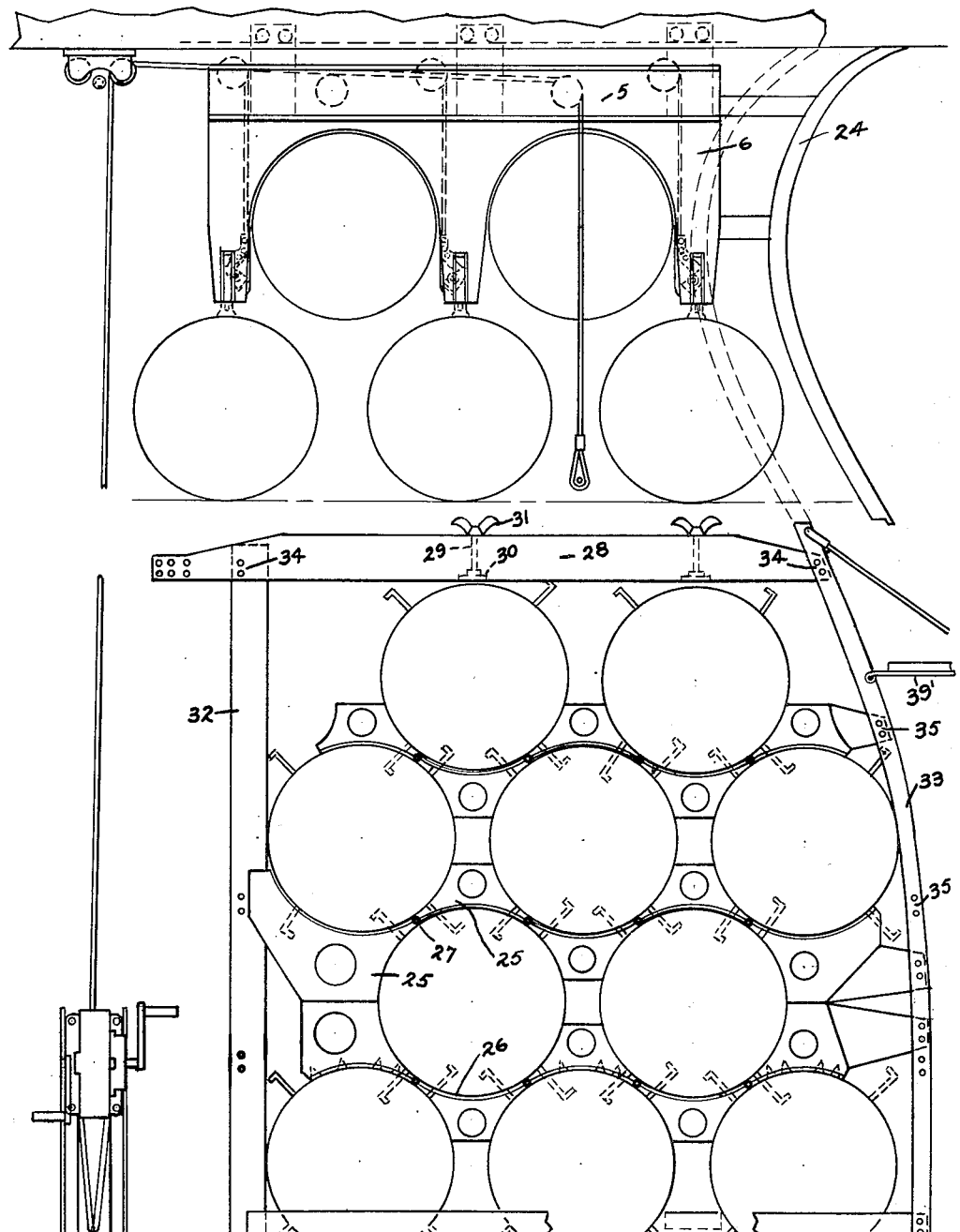

Dec. 16, 1952  I. M. LADDON ET AL  2,621,565
BOMB HANDLING MEANS

Filed Dec. 14, 1939  5 Sheets-Sheet 3

INVENTOR
ISAAC M. LADDON
THEODORE P. HALL
BY
Ransom K. Davis
ATTORNEY

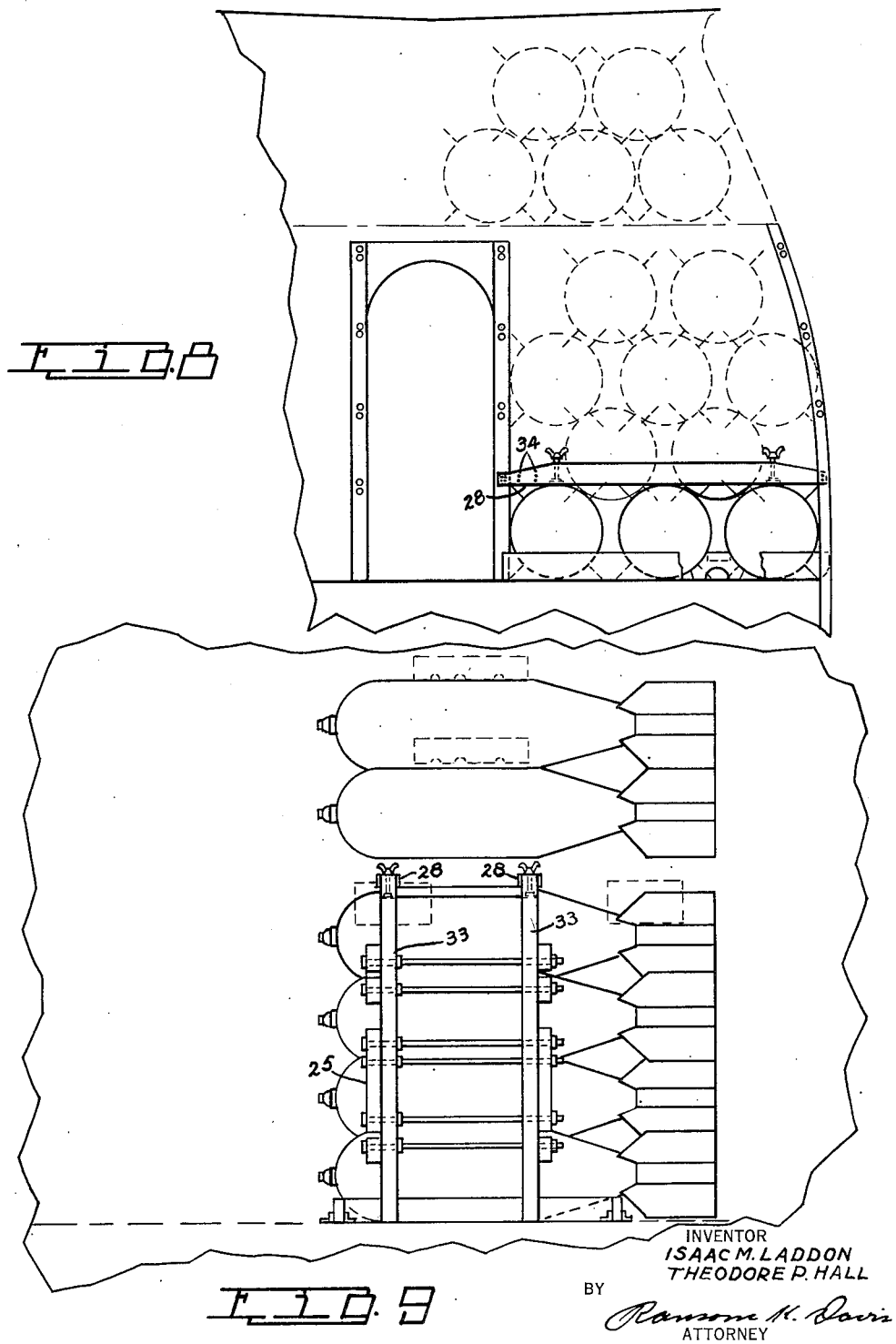

Dec. 16, 1952     I. M. LADDON ET AL     2,621,565
BOMB HANDLING MEANS

Filed Dec. 14, 1939                                           5 Sheets-Sheet 5

INVENTOR
ISAAC M. LADDON
THEODORE P. HALL
BY
Ransom K. Davis
ATTORNEY

Patented Dec. 16, 1952

2,621,565

UNITED STATES PATENT OFFICE 2,621,565

BOMB HANDLING MEANS

Isaac M. Laddon and Theodore P. Hall, San Diego, Calif.

Application December 14, 1939, Serial No. 309,150

9 Claims. (Cl. 89—1.5)

1

This invention relates to the loading, stowing and release of bombs carried by an aircraft and has particular application to flying boats which are equipped with a hull structure for landing, while in the water. It has not proven feasible to drop bombs through the bottom of the hull of a flying boat, as is done in connection with land plane fuselages, since no bomb door seal has been developed to stand the high water pressures incurred in landing.

It is an object of this invention to provide for loading and stowing bombs or cargo in an airplane, which means is efficient, compact, light in weight and which does not impair the structural strength of any part of the airplane nor add appreciably to the parasite resistance of the airplane in flight.

It is a further object of this invention to provide for the stowage of bombs in an airplane in such a manner that they may be serviced during flight.

It is a still further object of this invention to provide means by which the bombs may at will be carried from stowage to a position clear of the hull, fuselage or other part of the airplane for release, such means being so constructed as to add no appreciable parasite resistance to flight when not in use.

Other objects of this invention will become apparent upon a consideration of the following description, together with the accompanying drawings, in which:

Fig. 1 is an oblique view in perspective, of the exterior of an airplane showing only the inboard part of the wing with the bomb carriage attached.

Fig. 2 is a view in transverse section of the hull of a flying boat showing another embodiment of the carriage.

Fig. 3 is a front view of a fragment of a wing showing the carriage being used for handling cargo.

Fig. 4 is a plan view of the carriage operating mechanism.

Fig. 5 is a view taken in transverse section of a portion of an airplane hull and wing, showing the stowage of bombs therein and the carriage with bombs attached.

Fig. 8 is a transverse sectional view of a portion of an airplane hull showing bombs stowed therein in accordance with the invention.

Fig. 9 is a longitudinal sectional view of a por-

2 tion of an airplane body with bombs stowed therein, as in Figs. 5 and 8; and

Figure 10:
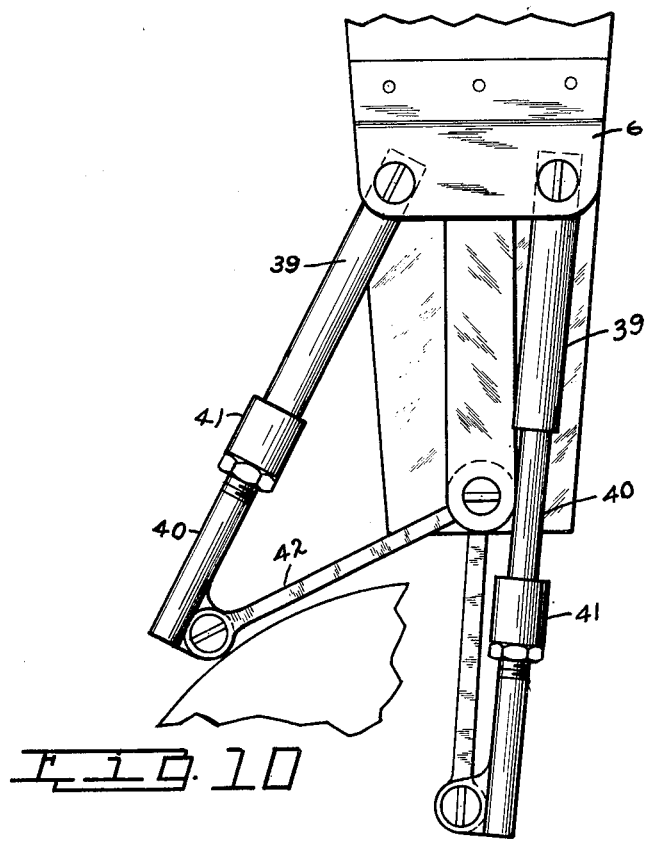

Fig. 10 is a detail view of a fragment of the bomb carriage showing the bomb chocks.

Referring to Fig. 1, there is shown an airplane having a hull 2 to which is attached wing 1, carrying, in this case, bomb or cargo carriage 3 which is supported from tracks 11 in the wing. It will be noted that the carriage 3 has attached thereto a portion 4 of the hull wall, which, when the carriage is in the position shown, leaves an opening in the side of the hull.

The carriage is shown more in detail in Fig. 5. It consists of a horizontal framework 5 from which depends three vertical partitions 6. Swung between the partitions 6 are two bombs and from the bottoms of each of the partitions are three more. Other combinations of bombs or single bombs are applicable to the claims herein.

Fig. 10 shows one of the partitions 6 of the bomb carriage with bomb chocks attached. The purpose of these chocks is to prevent swaying of the attached bomb. Each of the chocks consists of a sleeve 39 pivotally attached at its upper end to the partition 6. Inserted into the lower end of the sleeve is a rod 40. The rod is threaded for a portion of its length and carried on the threaded portion is a nut 41. To the lower end of the rod is pivotally joined an arm 42, the upper end of which is pivotally joined to the lower end of partition 6. When a bomb is swung into position beneath partition 6 the nut 41 of each of the bomb chocks is turned to force the rod 40 out of sleeve 39 until the lower end of each arm 42 bears against the bomb. Thus the bomb is held rigidly against side sway. The arcuate portions of the carriage between the partitions hold the bombs attached there against swaying. When the lower bombs are dropped the chocks drop down, as seen on the right of Fig. 10, to be out of the way of the upper bombs when they are dropped.

Figure 6:
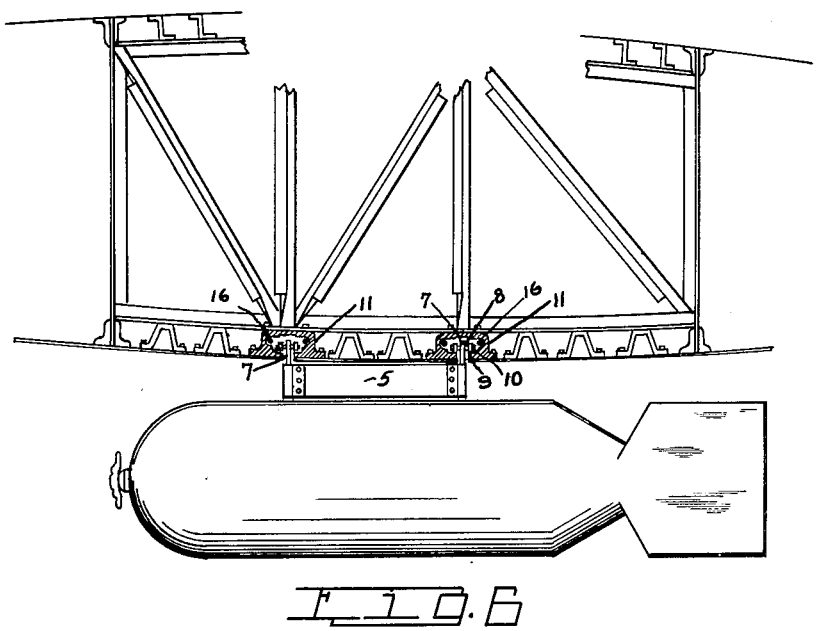
Fig. 6 is a view in section of a portion of the wing and the bomb carriage tracks showing the carriage and a bomb attached thereto.
Figure 7:
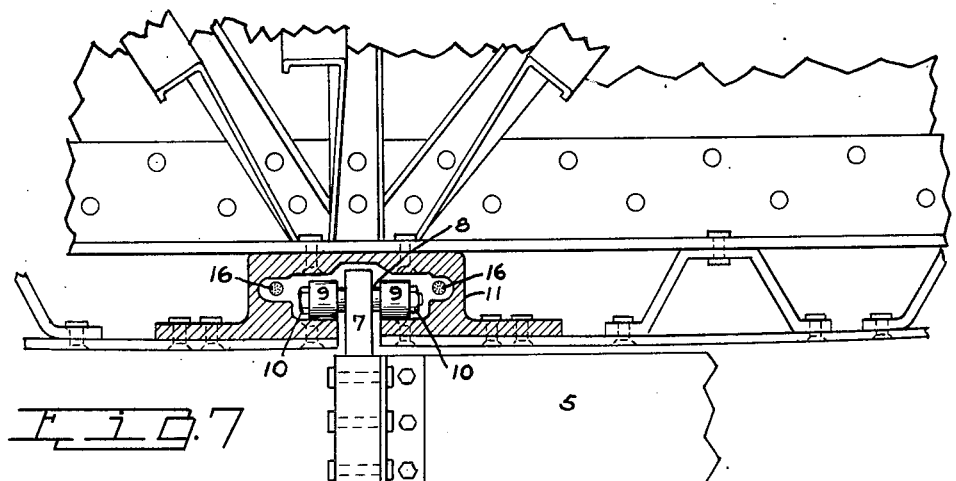
Fig. 7 is a detail view showing an enlarged section of one of the bomb carriage tracks and a portion of the carriage structure.

The carriage is suspended by lugs 7 carrying pins 8 on which are mounted rollers 9, these details being best shown in Fig. 7. The rollers 9 travel on internal trackways 10 formed in the hollow track member 11. It will be noted in Figs. 6 and 7 that the track members each replace a hatstringer in the wing framework, and being structurally at least as strong as hat-stringers these track-members do not detract from the structural characteristics of the wing. The small slots through which the lugs 7 extend are narrow in width and introduce practically negligible parasite resistance, this resistance being so small as to render unnecessary the covering of the slots. The aggregate width of the slots need not exceed 3% of the wing chord at greatest. This limit gives ample accommodation to the lugs of the carriage.

The carriage operating mechanism is shown in Fig. 4. Attached to the outer end of the carriage 3 is the cable 16 which is led around pulley 23 and attached to the chain 20 which passes around sprocket 22 and attaches to the inboard end of carriage 3. This provides a complete circuit, operation of which moves the carriage. The sprocket 22 may be operated through a gear 18 and worm 10 on shaft 17 by either a hand crank 15 or through the gear box 14 by a motor 13. The cable and chain are led through the track member 11, as will be seen in Fig. 7.

Fig. 5 shows a portion of the hull of an airplane with bombs stowed therein and with the bomb carriage almost in its farthest inboard or housed position. It will be noted that the carriage has attached to its outboard side a portion 24 of the hull wall of the airplane. When the carriage is in its farthest inboard position this portion forms a smooth continuation of the hull and leaves no exposed elements to add to the parasite resistance of the airplane. Another portion 39' of the hull wall swings downwardly when the carriage is out to form a loading platform.

The apparatus and method used for the stowage of bombs in the hull, as shown in Fig. 5, is a part of this invention. The bombs are stowed in tiers with the bombs in each tier in alternating spaced relationship to the bombs of adjacent tiers. The individual bombs are positioned by means of articulated spacing means composed of blocks 25, of wood or other material, shaped to snugly fit around the bombs. The blocks are connected by means of a metal band 26 provided with hinges 27 between each pair of blocks. The metal band passes along that edge of each block which contacts the adjacent bomb. The shaping and arrangement of the blocks is such that a large portion of the periphery of each bomb is snugly supported and thus there is little danger of deforming or crushing, due to the weight of bombs above. Above the group of bombs passes a pair of metal beams 28. In each beam and directly above each of the bombs in the top tier is located a bolt 29 fitted at its bottom end with a metal plate 30. The bolt is threaded through the beam 28 and provided at its top with a winged head 31 by means of which it can be screwed down so that plate 30 forcibly contacts the bomb beneath it, thus holding the group of bombs against movement. Inboard of the group of bombs are located two vertical beams 32 and outward of the group are two substantially vertical beams 33 formed to follow the lines of the hull wall and forming part of the structure thereof. The beams 28 have near their ends pairs of holes 34 which match with corresponding pairs of holes 35 formed in the vertical beams 32 and 33. The holes in the latter beams are so spaced that by the use of pins the beams 28 may be positioned in holding relation to any tier of bombs. Fig. 8 shows the beams 28 located above a single tier of bombs. The beams 28 are provided with vertical holes other than those used in the showing of Fig. 5, so that the bolts 29 may be shifted to be directly over any desired bomb. Note that the inboard ends of beams 28 are also provided with alternate sets of holes 34 to accommodate the varying span which must be covered by the beams 28 when positioned over different tiers of bombs.

Fig. 3 shows the carriage in use for handling cargo. The shape of the carriage has been modified somewhat for this purpose but the operation remains the same.

Fig. 2 illustrates a modified form of carriage which does not require tracks in the wings for its operation. The carriage is of the cantilever type and operates directly from the fuselage or hull. Its side walls are in the form of trusses 35'. The outboard end wall 36 of the carriage forms a portion of the side wall of the body when the carriage is completely housed, as shown in full lines. The trusses 35' have rollers 37 attached to their upper and lower edges, which rollers operate in tracks 38 extending transversely of the hull. The carriage is shown in dotted lines in its extended or out position.

In using the carriage to load bombs or cargo aboard the airplane, it is first moved to its out position, as shown in Fig. 1. A portable hoist may be used to raise the bombs or cargo in position to be hooked on to the carriage. The latter is then moved in to its housed position and a hand hoist, as shown in Fig. 5, may be used to lower the bombs or cargo into its stowage space. The same hoist may be used to raise bombs while the plane is in flight into position to be hooked on to the carriage. The bombs may be serviced by this means and when it is desired to drop them it is only necessary to run the loaded carriage out to its position and release the bombs carried thereby by release means which forms no part of this invention, and is therefore not shown.

The operation of the carriage shown in Fig. 2 is the same as that described above.

The invention described herein may be manufactured and/or used by or for the Government of the United States of America for governmental purposes without the payment of any royalties thereon or therefor.

What is claimed is:

1. An airplane comprising a fuselage and wings, track members within said fuselage and extending spanwise along the under-side of said wings, and adapted for supporting a bomb or cargo carriage, said carriage comprising framework having a plurality of depending portions, an archway formed between said depending portions, said archways provided with means for attaching thereto a bomb, the said depending portions provided at their lower ends with means for attaching thereto a bomb, the said bombs being arranged in staggered relation in said carriage.

2. The substance of claim 1, the depending portions of said carriage provided with means for holding bombs in said carriage against lateral movement, said means comprising a pivotally attached sleeve, a rod slidable in said sleeve, said rod provided with an adjustable nut, the lower end of said rod pivotally connected to said depending portion by an arm.

3. The substance of claim 1, the depending portions of said carriage provided with a pair of means for holding bombs in staggered relation against lateral movement, said means comprising pivotally attached sleeves, a rod slidable in each of said sleeves, each of said rods provided with an adjustable nut, the lower end of each of said rods pivotally connected to said depending portions.

4. An airplane comprising a fuselage and wings, track members within said fuselage extending spanwise along the underside of said wings acting as wing stringers and adapted for supporting a bomb or cargo carriage, said fuselage having an opening in the side thereof, the outer surface of said track members lying within the normal wing contour, said track members being of integral structure and formed with a relatively narrow spanwise extending slot along the lower face thereof and internally formed with a trackway extending parallel to said slot, and a bomb or cargo carriage slidably supported on said track members and having at one end a closure for said opening, said bomb carriage comprising framework having a plurality of depending portions, an archway formed between said depending portions, said archways being provided with means for attaching thereto a bomb, said depending portions provided at their lower ends with means for attaching thereto a bomb, said bombs while attached being arranged in staggered relation in said carriage.

5. An airplane comprising a fuselage and wings, unitary track members within said fuselage extending spanwise along the underside of said wings and adapted for supporting a bomb or cargo carriage, said fuselage having an opening in the side thereof, said track members replacing one or more of the usual spanwise wing stringers and performing the functions thereof, each of said track members being hollow and formed with a relatively narrow slot extending spanwise along the underside thereof, said track members being further provided with an internal trackway extending parallel with said narrow slot, and a bomb or cargo carriage suspended from roller means on said track members and having at one end a closure for said opening, said carriage comprising framework having a plurality of depending portions, an archway formed between said depending portions, said archways provided with means for attaching thereto a bomb, said depending portions provided at their lower ends with means for attaching thereto a bomb, said bombs while attached being arranged in staggered relation in said carriage.

6. An airplane comprising a fuselage and wings, unitary hollow track members within said fuselage and extending spanwise along the underside of said wings to serve as wing stringers, said wings having a slot extending spanwise along the underside thereof, each of said track members having a slot therein in alignment with said slot in said wings, an internal trackway formed in said track members, and a bomb or cargo carriage supported from said trackway, said carriage having upwardly extending lugs passing through said slots, said lugs carrying rollers adapted for travel along said internal trackway, said rollers being entirely enclosed within said track members, said bomb carriage comprising framework having a plurality of depending portions, an archway formed between said depending portions, said archways provided with means for attaching thereto a bomb, said depending portions provided at their lower ends with means for attaching thereto a bomb, said bombs while attached being arranged in staggered relation in said carriage.

7. An aircraft having a fuselage or hull and wings, said fuselage having an opening in the side thereof and spaced from its bottom, a storage space in said bottom for cargo, track means in said fuselage or hull, said track means extending spanwise in said wings, an article carrying carriage supported by said track means, and a fuselage or hull closure means carried by said carriage, said carriage adapted for movement along said track means from a position in which it is completely housed and the closure means closes said opening to a position in which it extends outwardly from said fuselage or hull, said carriage also comprising framework having a plurality of depending portions, an archway formed between said depending portions, said archways provided with means for attaching thereto a bomb, said depending portions provided at their lower ends with means for attaching thereto a bomb, said bombs while attached being arranged in staggered relation in said carriage.

8. An airplane having a fuselage or hull, said fuselage having an opening therein, spaced from its bottom, a trackway in said fuselage or hull and extending transversely of the fuselage or hull and along the wing of said airplane, said track supporting an article carrying carriage, said carriage being adapted for movement along said track from a position in which it is completely housed in said fuselage to a position remote from said fuselage or hull, said carriage provided with closure means whereby the opening in said fuselage is closed while said carriage is retracted, said carriage comprising framework having a plurality of depending portions, an archway formed between said depending portions, said archways provided with means for attaching thereto a bomb, said depending portions provided at their lower ends with means for attaching thereto a bomb, said bombs while attached being arranged in staggered relation in said carriage.

9. In an airplane wing structure, a unitary spanwise stringer comprising a hollow member having a spanwise extending substantially T-shaped slot extending the length thereof, the stem of the T opening to the exterior of the wing, and the interior walls defining the cross bar of the T providing an internal trackway in said hollow member adapted to support for movement therealong roller means, and roller means entirely enclosed within said stringer and having hanger means extending therefrom through the open stem of said T-shaped slot, said hanger means comprising framework having a plurality of depending portions, an archway formed between said depending portions, said archways provided with means for attaching thereto a bomb, said depending portions provided at their lower ends with means for attaching thereto a bomb, said bombs while attached being arranged in staggered relation in said carriage.

ISAAC M. LADDON.
THEODORE P. HALL.

REFERENCES CITED

The following references are of record in the file of this patent:

UNITED STATES PATENTS

| Number | Name | Date |
| --- | --- | --- |
| 954,041 | McDougall | Apr. 5, 1910 |
| 1,159,704 | Parsons | Nov. 9, 1915 |
| 1,237,890 | Fernandez | Aug. 21, 1917 |
| 1,318,955 | Barlow | Oct. 14, 1919 |
| 1,486,609 | Schwab | Mar. 11, 1924 |
| 1,921,228 | Hetherington | Aug. 8, 1933 |
| 2,069,996 | Carleton et al. | Feb. 9, 1937 |
| 2,094,464 | Park | Sept. 28, 1937 |
| 2,193,139 | Monteith et al. | Mar. 12, 1940 |
| 2,231,524 | Martin | Feb. 11, 1941 |

FOREIGN PATENTS

| Number | Country | Date |
| --- | --- | --- |
| 29,488 | Great Britain | of 1897 |
| 326,527 | Great Britain | Feb. 10, 1928 |
| 440,156 | Great Britain | Dec. 20, 1935 |